Feb. 17, 1953     D. H. MONTGOMERY     2,628,414
AUTOMATIC MACHINE TOOL.

Filed Jan. 15, 1948     8 Sheets-Sheet 1

INVENTOR.
Donald H. Montgomery

BY *Mitchner Berbert*
ATTORNEYS

Feb. 17, 1953     D. H. MONTGOMERY     2,628,414
AUTOMATIC MACHINE TOOL

Filed Jan. 15, 1948     8 Sheets—Sheet 2

INVENTOR.
Donald H. Montgomery

BY *Mitchell Buhert*

ATTORNEYS

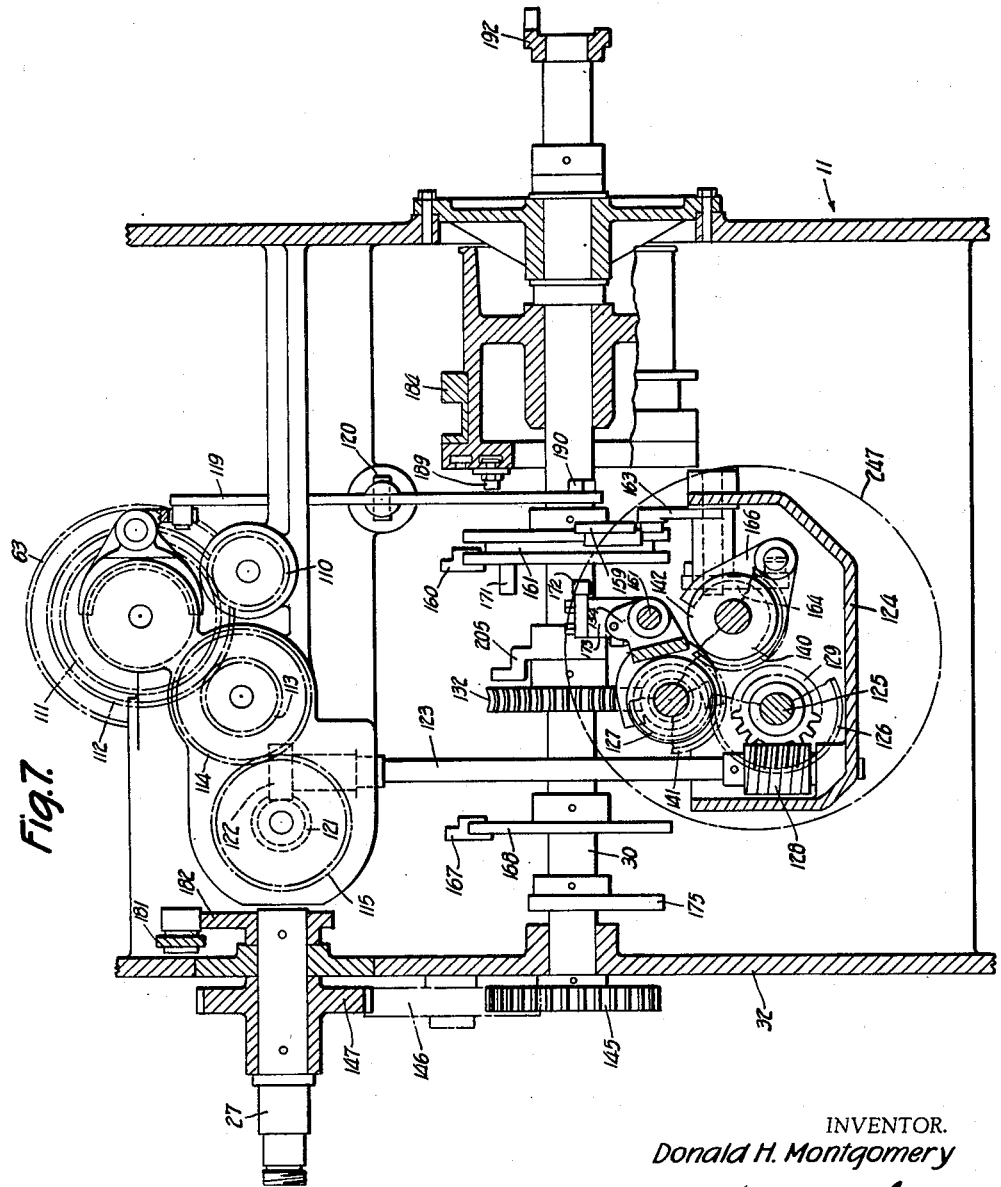

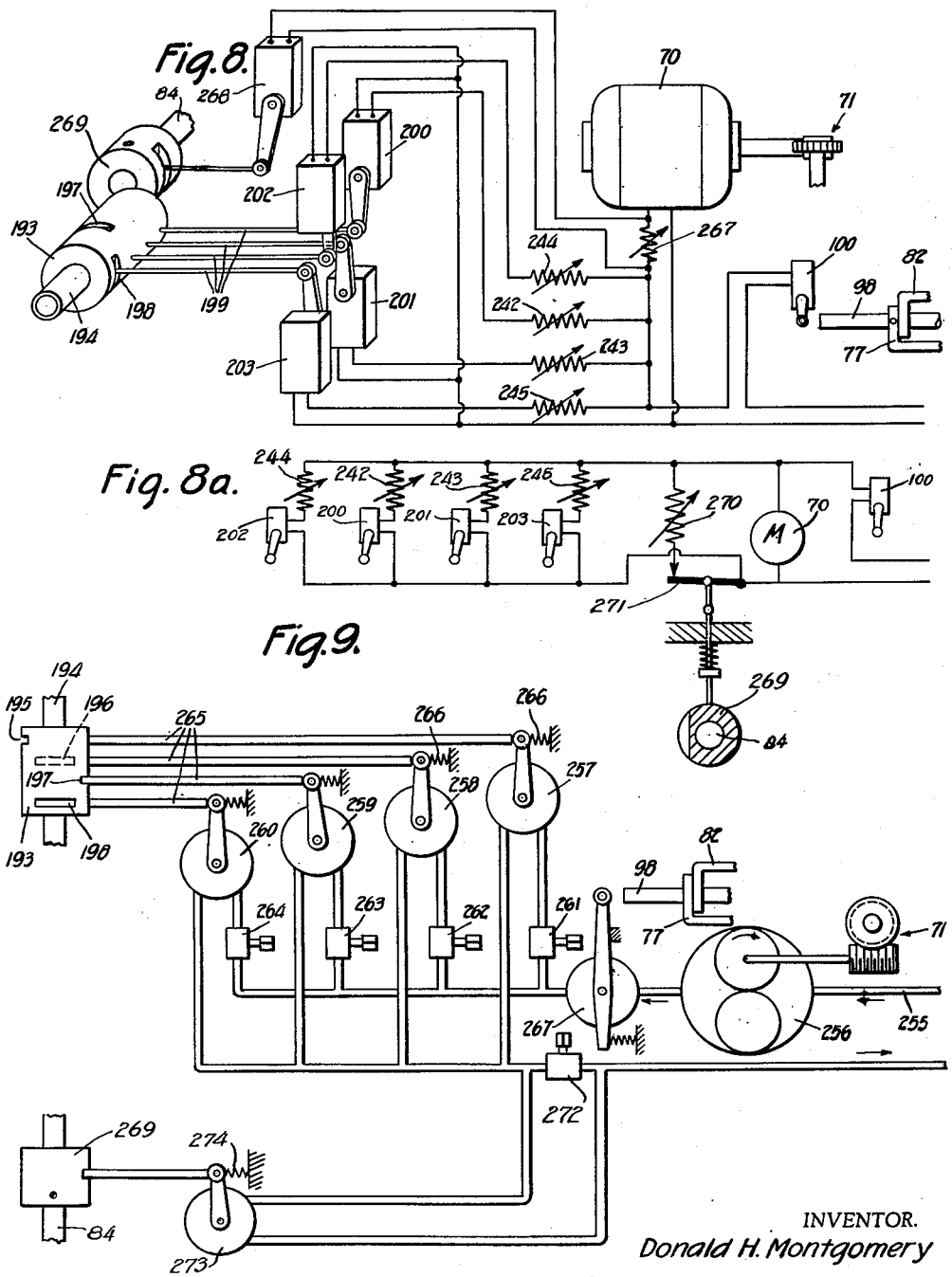

Patented Feb. 17, 1953

2,628,414

UNITED STATES PATENT OFFICE 2,628,414

AUTOMATIC MACHINE TOOL

Donald H. Montgomery, West Hartford, Conn., assignor to The New Britain Machine Company, New Britain, Conn., a corporation of Connecticut Application January 15, 1948, Serial No. 2,363

14 Claims. (Cl. 29—43)

1

My invention relates to an indexing-type machine tool.

It is an object of the invention to provide a device of the character indicated having improved adaptability to a variety of uses.

It is another object to provide an improved automatic turret lathe.

It is a further object to provide an improved automatic turret lathe including forming and cut-off means.

It is also an object to provide a machine of the character indicated with independent drive means for operating a multiple-station tool turret and for operating forming means.

It is a further object to provide synchronizing means in a machine of the character indicated for coordinating a given cycling of a tool turret with the cycling of a forming mechanism.

It is an object to provide safety means for a machine of the character indicated to assure that a piece of work will not be finally cut off until all turning tools are safely clear of the work.

It is an object to provide an improved mechanism offering multiple-speed independent drives for both turret and forming mechanisms independently of each other.

It is a more specific object to provide an automatic turret lathe with independently operated forming mechanisms and with means whereby turrets having different numbers of indexing stations may be readily interchanged.

It is another specific object to provide a selection of high and slow-speed drives for a turret and for forming mechanisms, and means for the independent selection of these speeds.

Other objects and various further features of the invention will be pointed out or will occur to those skilled in the art from a reading of the following specification in conjunction with the accompanying drawings. In said drawings, which show for illustrative purposes only, preferred forms of the invention:

2

Figure 1:
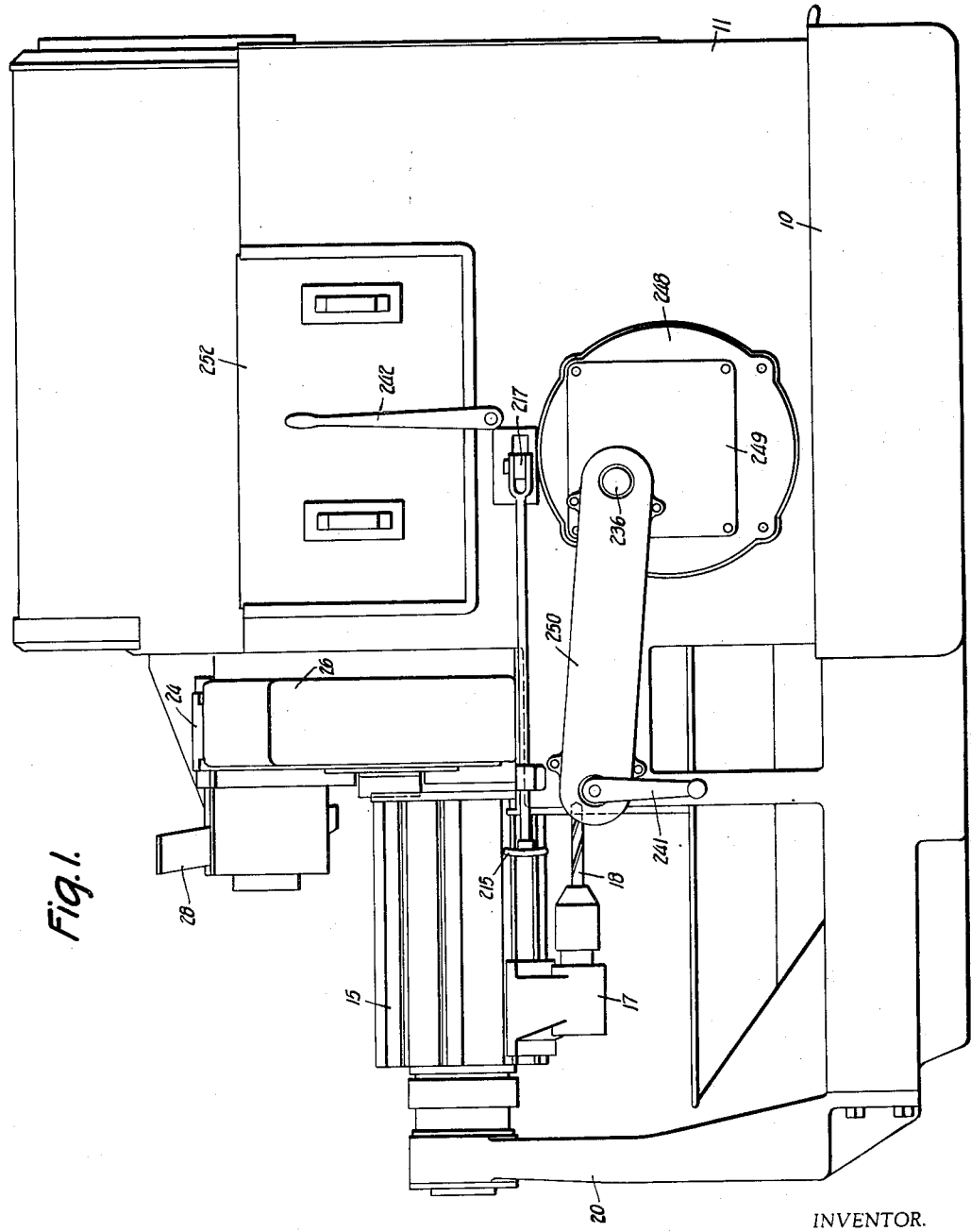
Fig. 1 is a side view in elevation illustrating a machine incorporating features of the invention, the view being taken from the operator's or right-hand side of the machine.
Figure 2:
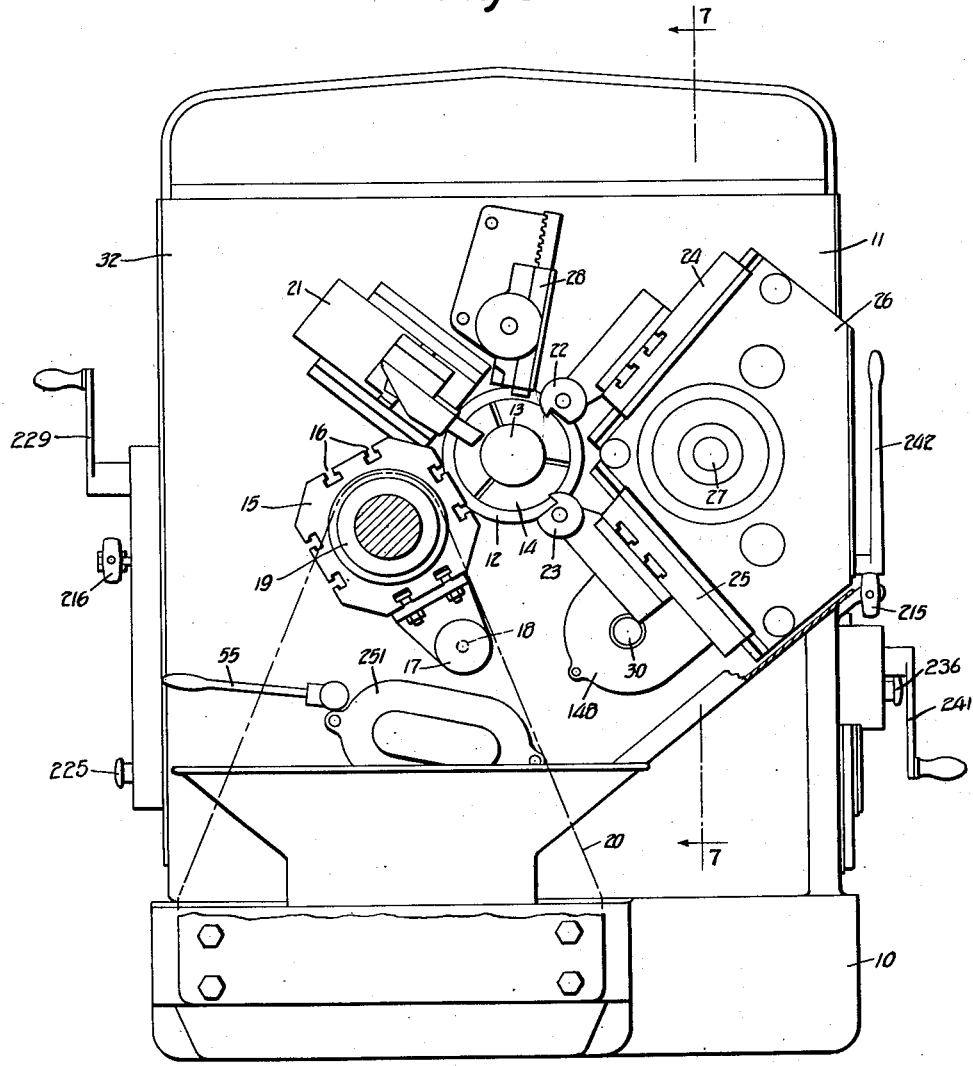
Fig. 2 is an end view or front view of the machine of Fig. 1.
Figure 5:
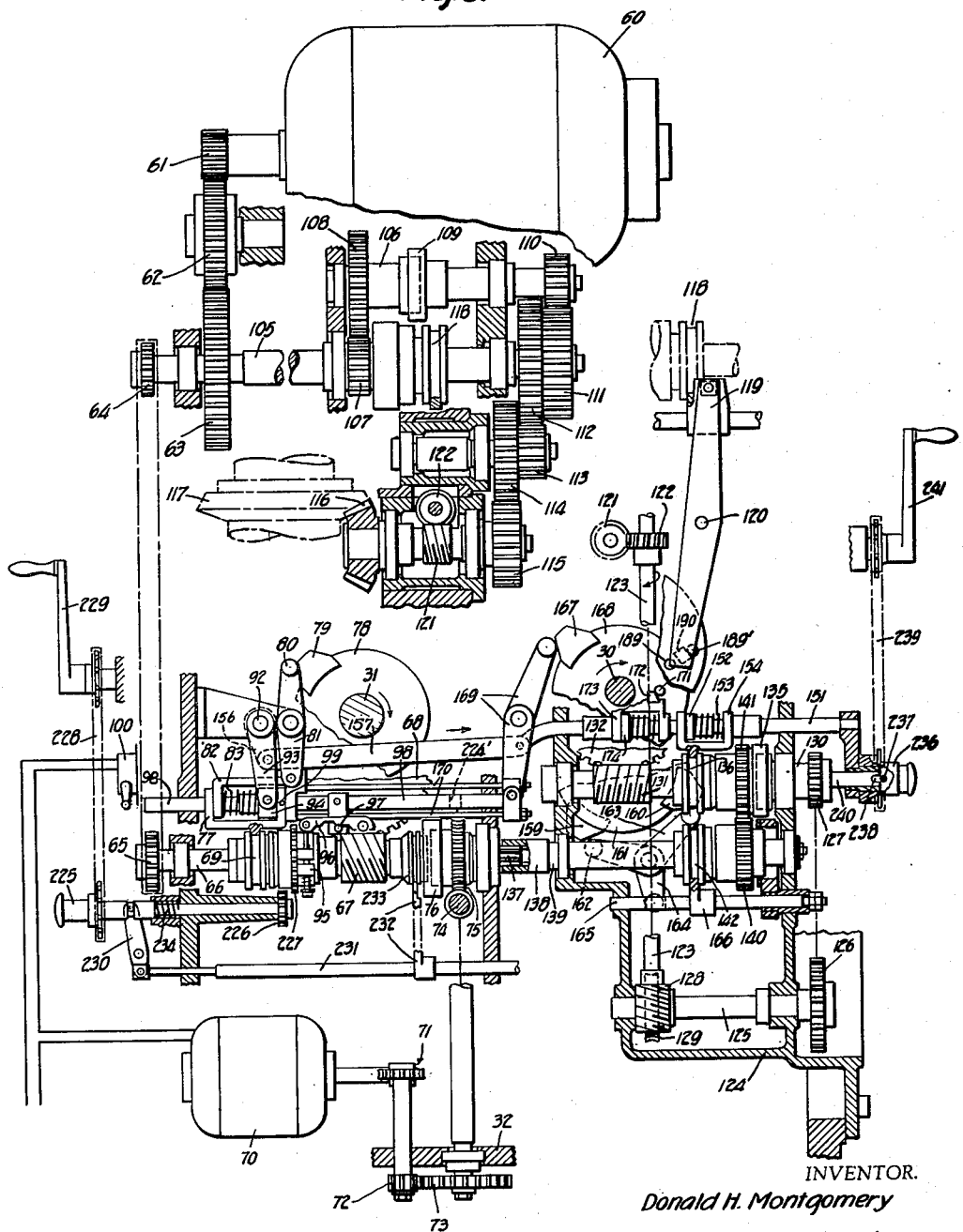
Figure 6:
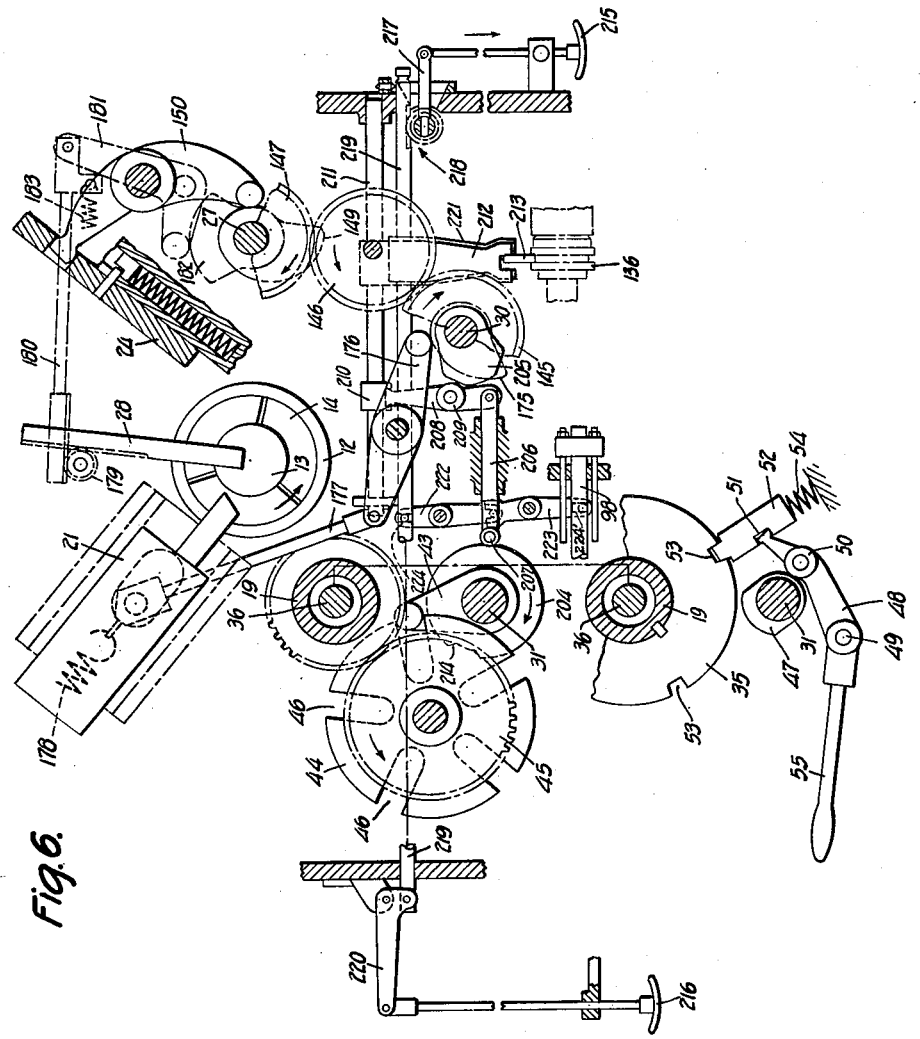

Fig. 5 is a generally schematic, vertical sectional view of parts of the mechanism of the machine of Fig. 1, as viewed generally from the front end of the machine;

Fig. 6 is another schematic vertical sectional view of mechanisms of the machine of Fig. 1, also as viewed from the front end of the machine;

Fig. 7 is a vertical sectional view taken substantially in the plane 7—7 of Fig. 2;

Figs. 8 and 8a are schematic representations of alternative electrical control circuits for use with parts of the machine of Fig. 1; and Fig. 9 is a view similar to Fig. 8, but illustrating a further alternative system employing hydraulic control means.

Briefly stated, my invention contemplates an automatic lathe-type machine in which a number of turning and other end-working tools may be mounted upon an indexible turret, and in which forming operations (including cut-off) may also be performed. According to my invention, the drives for operating the turret and for operating the forming, cut-off, and other mechanisms are independent of each other, and an interlocking recycling system cooperating between the two drives assures complete synchronism of the turret and forming cycles. The drive for the turret and for the forming mechanisms may be derived in each case from a camshaft and, in the form to be described, a plurality of speeds is available for each camshaft, the speeds being independently selectable for each camshaft. As a safety measure, and in order to protect parts of the machine against the danger of cut-off before turret tools are clear of the work, an automatic mechanism is disposed to arrest the cut-off function before it has proceeded too far. After the turret tools are clear, the safety mechanism incorporates a further feature for automatically completing the cut-off. The mechanism may then recycle itself automatically, or, in the event of manual chucking, it may stop itself.

Figure 3:
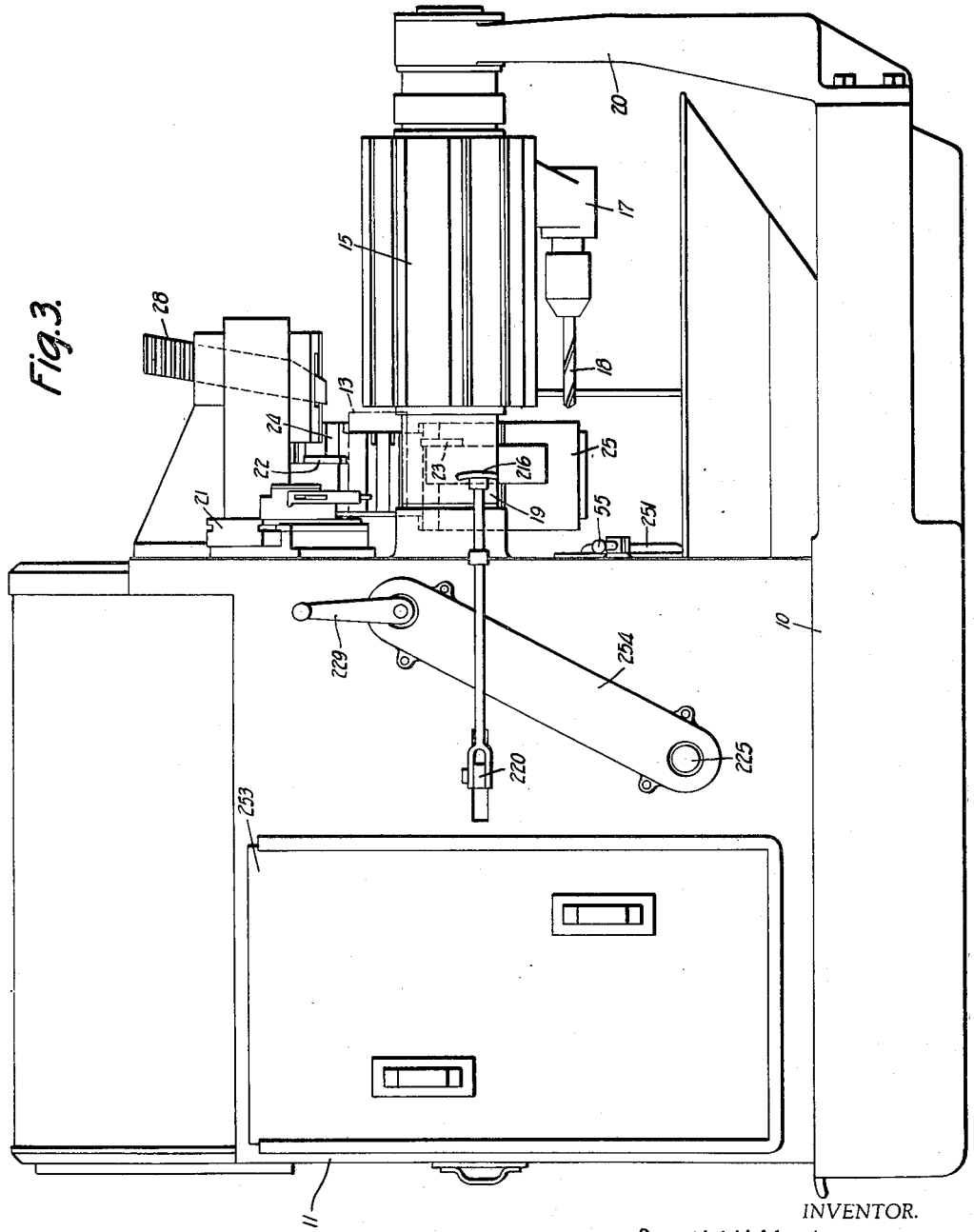
Fig. 3 is another side view of the machine of Fig. 1, as viewed from the left side, that is, from the side opposite the operator's side.

Referring to Figs. 1, 2, and 3 of the drawings, my invention is shown in application to a single-spindle automatic turret lathe having a base 10 upon which it is mounted at one end, and including a frame or power case 11 for substantially all the automatic mechanism including drive means. The machine is built around a single spindle 12, which may be hollow for the accommodation of internally fed bar stock 13, to be chucked or held in place by a collet 14. For turning operations, the machine includes a multiple-station turret 15 having mounting means, such as slots 16, for the accommodation of tool holders; a tool holder 17 is shown supporting an end drill 18. The turret 15 is shown to comprise four stations or sides, which may be indexed into working positions by a mechanism to be later described. The turret 15 may be slidingly supported on a relatively heavy arbor or stem 19, which in turn may be journalled both within the main frame 11 and in an end or outboard standard 20 at the front end of the machine. The feeding mechanism for feeding and retracting the turret 15 along its supporting arbor 19 will be later described.

In addition to turning as performed by tools mounted on the turret 15, the machine shown comprises forming means including a cut-off slide 21. If desired, forming tools 22—23 may be mounted on separate forming slides 24—25 in a common cross-slide battery 26, and feed cams (not shown) for both cross-slides 24—25 may be mounted on a common shaft 27 journalled in the cross-slide battery housing 26.

In a typical use of my machine, all operations of the turret 15 are governed by a so-called turret camshaft, and the remaining operations such as forming and cut-off (as well as operation of a stock stop 28, in the event of automatic internally fed stock) are operated by a second or forming-slide camshaft. Both camshafts will be more specifically described and identified later. Since the turning or turret operations are controlled independently of the forming operations, the turret may be caused to index and to feed between indexes for all four of its working stations over a period in which the forming operations occur but once. The forming operations may, therefore, be programmed during a full 360° of rotation of the forming-slide camshaft. A system of synchronization between the two camshafts may assure a proper relation between the multiple cycling of the turret and the single cycling of forming operations.

For a better understanding of the invention the several functional mechanisms of the machine shown in the drawings will be separately described.

The turret and the turret camshaft

Figure 4:
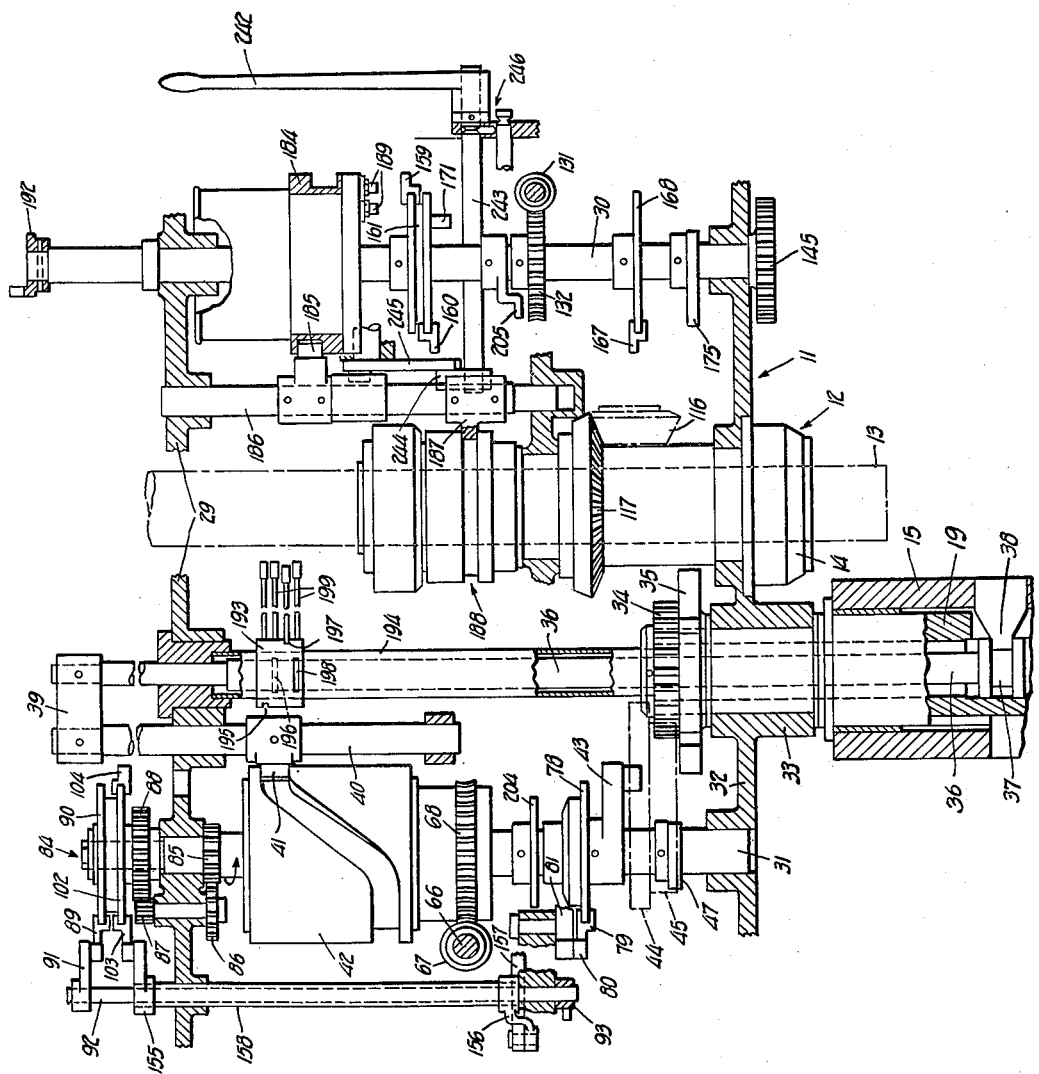
Fig. 4 is a generally schematic, horizontal sectional view illustrating some of the mechanism of the machine of Fig. 1.

Looking down on my machine, as in the schematic view of Fig. 4, and referring also to Figs. 5 and 6, the spindle 12 will be seen to be located generally centrally of the machine, with a forming-slide camshaft 30 to the right or on the operator's side, and with a turret camshaft 31 to the left. Both camshafts 30—31 and the spindle 12 may be journalled in the front wall 32 of the main frame 11 and in a rear plate or member 29 in the frame 11.

In the form shown, the arbor 19 which supports the turret 15 is keyed thereto, so that only longitudinal relative motion can occur between these members 15—19. The arbor 19 is journalled in the front frame plate 32 in a bearing 33 and preferably extends inwardly in the housing 11 fixedly to accommodate a gear 34 (meshing with the indexing mechanism) and a locking plate 35 to be used for accurately locking the turret in each of its indexed positions. In the form shown, longitudinal or feeding motion is imparted to the turret 15 by a rod 36 centrally supported within the arbor 19. At the turret end the rod 36 may carry a thimble 37 having an annular groove to be engaged by a finger 38 on the turret 15. At the other end, the rod 36 may be tied as by a bridging member 39 to a cam-follower rod 40 having a follower roll 41, to be guided by the slot of a drum-type feed cam 42 on the turret camshaft 31. It will be clear that with rotation of the camshaft 31, the follower rod 40 will be propelled in a feeding sense so as to carry the rod 36, and with it the turret 15, longitudinally toward and away from the work. This feeding cycle will occur for whatever the indexed position of the turret, as determined by the drive to gear 34.

Since indexing occurs preferably for each feed cycle of the turret 15, the indexing mechanism may be driven directly from the turret camshaft 31. In the form shown, a Geneva arm 43 is pinned to the camshaft 31 and positioned for engagement with the slots of a Geneva wheel 44. For purposes which will later be clear, the Geneva wheel 44 drives a gear 45 to mesh with the gear 34 on the turret arbor 19. In the form shown, the Geneva wheel 44 has five slots 46 to be engaged by the Geneva arm 43, and there are but four stations on the turret 15. Since the turret camshaft 31 makes one revolution for each feed cycle of the turret 15, the gear ratio between gears 45—34 should be 5:4.

The camshaft 31 may carry a further cam 47 for operating a locking mechanism to cooperate with the locking plate 35. In Fig. 6 it will be seen that this mechanism may include a lever 48 pivoted from a fixed part of the machine, as at 49, and including a follower roll 50 to ride upon a turret-locking cam 47. In the form shown, a projecting part of the lever 48 engages a notch or slot 51 in a locking pin 52 serially to engage the several locking recesses 53 in plate 35. The locking pin 52 is preferably normally urged, as by a compression spring 54, in a direction toward locking engagement with the plate 35. Thus, it will be appreciated that, for each indexing operation, that is, just prior to engagement of the Geneva arm 43 with the Geneva wheel 44, the cam 47 may be effective to withdraw the locking pin 52 from engagement with the plate 35 so as to permit the indexing function; and that, after accomplishment of indexing, the cam 47 may permit a resilient return of the pin 52 into engagement with the next slot 53 of plate 35. If desired, particularly for use in setting up the machine, when many manual operations are necessary, the lever 48 may be formed with a hand extension 55, which, in the form shown, is accessible from the front side of the main frame 11 of the machine.

In accordance with the invention, the turret camshaft 31 includes means for selectively engaging a plurality of drive speeds for its own rotation. In the form shown, there is a normal high-speed drive and there is a slow-speed drive, which may be utilized for feeding the turret. The slow-speed drive is variable preferably for each working station of the turret 15, so that there may be optimum cutting conditions for each working station. The high-speed drive is shown to be derived from a main motor 60 running a drive pinion 61 to operate a train of gears 62—63—64—65 to a shaft 66 extending transversely of the machine; the shaft 66 may be termed the high-speed drive shaft. The high-speed drive shaft 66 may be coupled to the turret camshaft 31, as through the worm 67 (coaxial with shaft 66) and worm wheel 68. A clutch 69 is preferably interposed between the high-speed drive shaft 66 and the worm 67, and, in the form shown, the clutch 69 may be actuated by displacement of a yoke 77 having a finger engaging the spool of clutch 69.

Slow-speed drive for the turret camshaft 31 may be provided by a second motor 70 geared down (as through the worm and worm wheel 71, change gears 72—73, and the worm 74 and worm wheel 75) to provide relatively slow rotation on the axis of the high-speed shaft 66. The motor 70 may be substantially continuously operated, frequently with wasted motion, by means of an overrunning clutch connection 76 to that part of the high-speed shaft which operates the worm 67. It will be clear that when the clutch 69 is disengaged, as by a leftward displacement of the actuating yoke 77, the substantially continuously operating slow-speed motor 70 may take over, for a slow-speed drive of the worm 67 and, therefore, of the turret camshaft 31.

Except for certain synchronizing functions, the remaining cams on the camshaft 31 need only be employed for a proper timing of the selection of a high-speed drive or of a slow-speed drive for the turret camshaft 31. Thus, a cam plate 78 supporting an adjustably displaceable cam lug 79 may serve for clutching-in the turret high-speed drive. In the form shown, the cam lug 79 actuates a cam follower 80 to crank an arm 81, which may be pinned to a yoke 82 resiliently connected to the yoke 77. Actuation of the crank arm 81 by a cam lug 79 will be understood to cause displacement to the right of the yoke 82, with a corresponding displacement to the right of the yoke 77, via the compression spring 83. This displacement of the yoke 77 may vary in extent depending upon the wear of clutch 69, but in any case will be understood to effect direct high-speed engagement of the worm 67 to the shaft 66. It will later be clear that the above-described operation of cam lug 79, that is, the high-speed drive of the worm 67, occurs preferably only for the interval in which it is desired that the turret-unlocking, turret-indexing, and turret-locking functions proceed.

In order to throw out the high-speed drive of the turret camshaft 31 and to introduce the slow-speed or feed drive through the overrunning clutch 76, I show an auxiliary camshaft 84 driven through reduction-gear trains 85—86 and 87—88 by the turret camshaft 31. The overall reduction-gear ratio of trains 85—86 and 87—88 is preferably the reciprocal of the number of working stations on the turret 15. In the form shown, therefore, the auxiliary camshaft 84 preferably rotates at one-fourth the speed of the turret camshaft 31. If there is to be a tool used for each working station of the turret 15, and since the auxiliary camshaft 84 rotates at the indicated reduced speed, there must be slow-speed starting means for each indexed position. In the form shown, I employ a separate cam lug 89 on a starting-cam disc 90 for each turret station to be fed. Thus, if all four working stations on turret 15 are to be used, there must be four cam lugs 89 spaced around the disc 90. The lugs 89 in the form shown, are tracked by a cam-follower arm 91 on a longitudinally extending shaft 92 projecting forward to drive a crank 93 for operating the clutch 69. In the sense of Fig. 5 of the drawings, the actuating crank 93 will be displaced clockwise as the cam follower 91 rides up on each starting lug 89. For easy action that may be effective regardless of wear in clutch 69, I prefer that the actuating crank 93 displace the yoke 77 through resilient means, and the spring 83 may be utilized for this purpose. Thus, the crank 93 may be pinned to a boss 94, and a declutching of the clutch 69 will occur only via resilient compression of the spring 83. Once clutch 69 is disengaged, it will be understood that the slow-speed drive from motor 70 controls the speed of worm 67 via the overrunning clutch 76.

In order that the transition from high to slow-speed drive of the worm 67 may be effective with minimum coasting, that is, with as little loss of time as possible, the clutch unit 69 may include at its right end, that is, at the end nearer the worm 67, a brake 95, which in the form shown is actuated by the raising or lowering of a short crank 96. The underside of the crank 96 is shown programmed with a cam surface having two spaced flats separated by a trough, and a pin 97 is positioned to ride along this cam surface upon displacement of a clutch-actuating rod 98, the rod 98 being pinned, as at 99, to the yoke 77. For the form shown, the trough of the brake crank 96 represents a brake-on position, and the two flats on each side of this trough represent brake-off positions. Thus, each time the actuating yoke 77 is displaced from clutching to unclutching position for the clutch 69, there may be an instant in which the pin 97 rides in the trough 96 in order momentarily to apply the brake 95. In the case in which there has been a high-speed driving of the worm 67 from the high-speed drive shaft 66, the declutching of clutch 69 will be understood to be accompanied by a sufficient braking (due to the momentary operation of brake 95) substantially to kill the momentum in the worm 67 and in other parts driven thereby, whereby slow-speed drive through the overrunning clutch 76 may be immediately initiated.

For synchronizing purposes, and as will later be clear, I prefer that one of the cam lugs 89 be slightly higher than the other three or so lugs 89, that is, I prefer that the crank 93 should make one actuating sweep larger than the others, for each rotation of the auxiliary camshaft 84. This sweep may be of sufficient extent to place the leftward projecting end of rod 98 in operative engagement with a normally closed limit switch 100, which may be mounted on the frame of the machine and in the circuit of the slow-speed motor 70. Thus, it will be clear that once for every full rotation of the auxiliary camshaft 84, that is, once for every complete cycle of use of the turret 15 for all its working stations, the slow-speed drive 70 may be shut down. When such shut down occurs, it will be understood that the high-speed clutch 69 is disengaged, so that the worm 67, and hence the turret camshaft 31, may then receive neither slow nor high-speed drive.

To complete the listing of cams which are shown operated by the turret camshaft 31, there is a safety cam 204, the purpose of which will be described later. On the auxiliary camshaft 84 there may be provided a cam disc 102 for supporting cam lugs 103—104 to initiate rotation of the forming-slide camshaft 30. The connection and purpose of cams 103—104 will also be described later.

*The spindle drive*

The drive for the spindle 12 may be of more or less conventional form. In the form shown (see Figs. 4 and 5), it utilizes the main motor 60 and the gear train 61—62—63, and the gear 63 may drive a shaft 105 to a two-speed transmission. Normally, a slow-speed drive may be utilized and in the form shown, this drive is obtained through a back-gear shaft 106 driven by a reduction-gear train 107—108. The shaft 106 is shown in two parts separated by an overrunning clutch 109 for driving a pinion 110. The pinion 110 may be one of a set of change gears, including also gears 111—112—113—114—115. The gear 115 provides direct drive to a bevel pinion 116, which in turn meshes with an annular bevel gear 117 on the spindle itself.

High-speed drive for the spindle 12 may be obtained by a direct connection of the shaft 105 to the gear 112, as by engagement of a clutch 118. It will be clear that, when the clutch 118 is engaged, the clutch 109 will be permitted to overrun or to free-wheel, so that only the clutch 118 need be employed for a shifting of speeds. This shifting may be effected through an actuating crank 119, which may be pivotally supported as at 120 on the frame of the machine, and which may be operated in a manner later to be described by cam means 189 on the forming-slide camshaft 30.

*The forming-slide camshaft and its drive*

As its name implies, the forming-slide camshaft 30 is preferably utilized primarily for the operation of forming slides, cut-off tools, and other accessories (such as stock stop 28) which need be operated only once for every piece of work produced. Normal drive of the camshaft 30 is relatively slow and in the form shown (Fig. 5) is obtained by a worm-and-worm-wheel take-off 121—122 to jackshaft 123 running vertically downward into a gear box 124. In the form shown, the jackshaft 123 drives a transverse shaft 125 to change gears 126—127 through another worm and worm wheel 128—129. The gear 127 drives what may be termed a drive shaft 130 for the forming-slide camshaft 30. Again, as in the case of the drive for the turret camshaft 31, the forming-slide camshaft 30 may be driven through a worm 131 and worm wheel 132. The drive from gear 127 to the worm 131 may be made through an overrunning clutch 135 and through a clutch 136.

As indicated generally above, provision is made for multiple-speed drive of the forming-slide camshaft 30, and in the form shown a second speed is obtained by take-off from the high-speed drive shaft 66 on the turret side of the machine. The drive shaft 66 will be appreciated as extending coaxially within clutches 69—76 and as projecting to the right (Fig. 5) for driving the forming-slide camshaft 30. For this purpose, the projecting end of the high-speed drive shaft 66 may be formed with a spline 137 to lock with a correspondingly splined end 138 of an auxiliary shaft 139 in the gear case 124. The shaft 139 may drive the forming-slide drive shaft 130 directly through a gear train 140—141, as when a clutch 142 is engaged. It will be clear that when clutch 142 is engaged, the drive to the worm 131 will be at relatively high speed, at which time the overrunning clutch 135 may free-wheel. Once clutch 142 is disengaged, the slow-speed drive of the worm 131 (and hence of the forming-slide camshaft 30) may again be effective from the jack shaft 123 via the then-engaging overrunning clutch 135, as will be clear.

In the form shown, the forming-slide camshaft 30 imparts feed motion to the forming slides 24—25 through a train of gears 145—146—147. The gear 145 may be keyed to the forwardly projecting end of the camshaft 30, in order to be available for ready replacement merely by removal of a cover plate 148 on the front face of the housing or frame 11. The gear 147 will be appreciated as being on the cam-supporting shaft 27 within the forming-slide battery 26. In Fig. 6, the cam 149 is shown for forwardly feeding the forming slide 24, through the rocker-arm cam-follower 150. Since the gear train 145—146—147 is for the principal purpose of transposing the drive axis from camshaft 30 to shaft 27, the effective gear ratio is preferably 1:1.

In the starting of the forming-slide camshaft 30, clutch 136 may be engaged by a rightward (in the sense of Fig. 5) displacement of a transverse rod 151, acting through a boss or collar 152, through a compression spring 153, and through a yoke 154; the yoke 154, in turn, is shown to have a finger tracking the spool of clutch 136. This movement of rod 151 may be derived from starting cams 103 and 104 on the auxiliary camshaft 84, as by having a cam follower 155 follow cams 103 and 104 to turn a crank 156, connected to the rod 151 by a link 157. If desired, the shaft 158 to which cam follower 155 and crank 156 are locked may be tubular and mounted concentric with the turret slow-speed control rod 92. It will be clear that for every rotation of the auxiliary camshaft 84 (that is, in the case of the four-position turret shown, for every four revolutions of turret camshaft 31), each of cams 103 and 104 may cause one shift of the actuating rod 151 in a direction so as to engage the clutch 136, thereby starting the forming-slide camshaft 30.

As indicated, the usual drive for the forming-slide camshaft 30 may be relatively slow speed, as provided through jackshaft 123 and the overrunning clutch 135. In order to conserve time, it may be desirable to speed-up rotation of camshaft 30, as when forming tools are jumped to working positions from fully retracted positions. This jump operation may be effected by cam means on camshaft 30 and associated with the clutch 142 on the high-speed shaft 139. In the form shown, I employ two axially spaced cam lugs 159—160, adjustably positioned on a disc 161, to engage cam followers on two arms 162—163, respectively, of a three-arm rocker 164. The third arm of rocker 164 is shown engaging a recess in a slide bar 165, carrying a shift fork 166 which rides in the spool of clutch 142. It will be appreciated that with a clockwise rotation (in the sense of Fig. 5) of the forming-slide camshaft 30, cam 159 may first be effective to cause counter-clockwise rotation of rocker 164, with resultant engagement of clutch 142 so as to connect a high-speed or jump drive to camshaft 30. Shortly thereafter, cam follower 163 may ride on cam 160 to cause a clockwise rotation of rocker 164, with resultant disengagement of clutch 142, to permit slow or feed drive of camshaft 30 through the overrunning clutch 135, as will be clear.

For synchronizing purposes, the forming-slide camshaft 30 preferably drives means for recycling a stopped turret camshaft 31 and for shutting off the drive for the forming-slide camshaft 30. In the form shown, a turret-starting cam 167 is adjustably positioned on a disc 168 on the forming-slide camshaft 30; and, through a cam-follower rocker arm and crank 169, the cam 167 may forcibly shift tie rods 170 and the yoke 82 to the right, in the sense of Fig. 5. It will be clear that for each such shift of arm 169, and with it yoke 82, yoke 77 is resiliently urged through spring 83 in a direction to engage the high-speed drive shaft 66 to the turret camshaft 31.

Shortly after, and preferably just after the cam 167 has been effective to start and thus to recycle the turret camshaft 31, further cam means on the forming-slide camshaft 30 may be effective to disengage all feeds to the said forming-slide camshaft 30. In the machine shown, I employ what may be termed a feed knock-out pin 171 which may be carried by the cam disc 161. The knock-out pin 171 is shown positioned to engage a projecting lug 172 on a clutch-shift yoke 173 on the actuating rod 151 and to shift the yoke 173 to the left. The yoke 173 is preferably resiliently spaced from a boss 174 on rod 151, so that a shifting of yoke 173 may effect a resilient disengagement of the main clutch 136 for the forming-slide camshaft 30.

Other functions which may be performed or driven by the forming-slide camshaft 30 include operation of the cut-off slide 21, of the stock-stop 28, of the collet or chuck 14, and of an automatic stock-feed mechanism (not shown). In the form of cut-off mechanism shown (Fig. 6), a cut-off cam 175 operates a cam-follower rocker arm 176 to produce a feeding (downward) pull on a rod 177, linking arm 176 to cut-off slide 21. A spring 178 in the cut-off slide assembly may be continuously stressed in tension, and thus serve to keep the cam-follower 176 riding constantly on cam 175 and to assure cut-off tool retraction, as will be clear.

The stock-stop 28 is shown formed with rack teeth to engage an idler pinion 179 driven by another rack on an actuating rod 180. The rod 180 may be actuated by a bell-crank 181 having an arm to follow a stock-stop cam 182. In the form shown, the stock-stop cam 182 is driven by the central shaft 27 in the cross-slide battery 26, which it will be recalled operates 1:1 with the camshaft 30. A spring 183 may be employed to assure proper cam-follower action and retraction of stock-stop 28.

In a fully automatic operation of my machine, the collet or chuck 14 may be operated from the camshaft 30. In the form shown, a drum cam 184 performs this function through a cam follower 185 tied by a slide bar 186 to an actuating fork 187. The fork 187 in turn may ride in the groove of a spool 188 of a drawback-type actuating mechanism for the collet 14. It will be appreciated that in Fig. 4 the cam-follower 185 has been drawn back and that the collet 14 is, therefore, closed upon the stock 13.

In the present machine, the stock 13 may be fed by an automatic stock-feeding mechanism of the type which constantly applies feeding forces, so that feeding may commence as soon as the chuck or collet 14 is relaxed. A hydraulic or pneumatic stock-feed mechanism (not shown) may prove entirely adequate for the purpose. In the event other types of stock-feed mechanism are employed, it may be desirable to energize the stock-feed mechanism in timed relation with the chucking function, and a cycling cam 192 may in that event be carried by the forming-slide camshaft 30, as will be clear.

It will be clear that with a proper design and relative placement of cams 149, 175, 182, and 192, each forming, cut-off, stock-stop, and stock-feed function may be made to occur in proper sequence and but once for a revolution of camshaft 30.

The forming-slide camshaft 30 has been described as correlating and timing essentially those operations which need be performed but once for each piece of work that is to be produced. In certain cases, it may be desirable to utilize this camshaft for still further operations; for example, in order to produce a fast cut-off, it may be desired momentarily to increase the spindle speed as by engaging the clutch 118. In the form shown, a pair of pins 189—189' on the drum cam 184 may serve this purpose, by engaging an inclined block 190 carried by the rocker arm 119. It will be clear, then, that, as the pins 189—189' are carried clockwise (Fig. 5) with camshaft 30, pin 189 may be the first to engage block 190; whereupon the rocker arm 119 may be urged counterclockwise, so as to engage the clutch 118 and to overrun the clutch 109. In accordance with the desired arcuate spacing of pins 189—189', pin 189' may next strike block 190, to shift arm 119 back to its former position and thereby to declutch the high-speed spindle drive, as will be clear.

*Automatic operation*

In the automatic operation of my machine, it will be appreciated that there need be but one cycling of the forming-slide camshaft 30 for a number of cyclings of the turret camshaft 31, which number will depend upon the number of working stations on the turret 15.

Let it be assumed that the machine is running automatically, that it has just completed the last, that is, the fourth feeding cycle for the turret 15, and that the forming-slide camshaft 30 has just completed the process of chucking-up a new piece of stock 13, and of retracting the stock-stop 28. In such event, the clutch-actuating rod 98 (Fig. 5) will be in its leftmost position so as not only to have disengaged the main high-speed drive 66 for the turret camshaft 31, but also to have opened the limit switch 100 and thus effectively to have disengaged the slow-speed drive (i. e. motor 70). The friction clutch 136 for the forming-slide camshaft 30 will, however, still be in its engaging position, so that the forming-slide camshaft 30 will be under the relatively slow drive from jackshaft 123.

At the described instant, the cam lug 167 will be poised to operate the cam-follower rocker-arm 169, and upon such rotation the tie rods 170 will shift the yokes 82 and 77 to the right so as to engage the high-speed drive clutch 69, to start the turret camshaft 31. Having accomplished the function of thus starting the turret camshaft 31, the forming-slide camshaft 30 may be shut down immediately, as by engagement of the feed knock-out pin 171 with the cam block 172 carried by yoke 174.

With the forming-slide camshaft 30 stopped or shut down, and with the turret camshaft 31 in high speed, the first operation may be a fast cranking of the indexing arm 43 (preceded, of course, by a removal of locking pin 52 upon operation of cam 47) so as to index the turret 15 to its first working position. Upon completion of the index, cam 47 may allow a resilient return of the locking pin 52 so as to anchor the turret 15 for its first working station. Preferably coincidentally, the first lug 89 on the turret slow-speed cam disc 90 cranks the actuating arm 93 to disengage the turret high-speed clutch 69. This disengaging action will be understood to involve first a braking of the high-speed drive and then a release of the brake 95, while the clutch 69 is disengaged, but not to involve operation of the limit switch 100. It will also be understood that when the clutch 69 was first engaged, the limit switch 100 was permitted to return to its normal closed position and thus to start the slow-speed motor 70. Thus, when the first turret slow-speed cam 89 throws out the high-speed clutch 69, there is available a substantially constantly running slow-speed drive from the motor 70, and this drive may take over when the speed of worm 67 slows sufficiently for engagement of the overrunning clutch 76.

During the period of slow-speed drive, the cam 42 may produce the first feed cycle of the turret 15. After feeding has been completed, the high-speed starting cam 79 may be in position to actuate the clutch 69 so as again to throw in the turret high-speed drive. Turret unlocking, indexing, and turret locking may then be effected with dispatch so as to set the turret for a second working cycle, and the slow-speed feed for this second cycle may be started by a second cam lug 89 serving to throw out the high-speed clutch 69. It will be understood that the third and fourth cycles of turret operation may be effected in a similar manner, with the feed in each case being initiated by one of the cam lugs 89.

Depending upon the amount of forming to be done on the work, the forming-slide camshaft 30 may be operated during one, two, or more of the four cycles of the turret. It may, for example, be desirable to start the forming operation during the third cycle of the turret. Such timing may be effected by proper placement of the cam lug 103 on cam disc 102, and it will be recalled that the disc 102 rotates once for every four revolutions of the turret camshaft 31. The forming-slide camshaft 30 may thus be started by the operation of cam follower 155 riding on the cam lug 103, to shift the rod 151 to the right and thus to engage the clutch 136. It will be understood that upon engagement of the clutch 136, the normal drive of the forming-slide camshaft will be relatively slow speed, as derived from the jackshaft 123. Forming operations, as determined by the shape and placement of cams, such as cam 149 on the shaft 27, may begin immediately. The forming tools may be "jumped" into position by a momentary high-speed drive of the forming-slide camshaft 30, and it will be recalled that cam lugs 159—160 may determine the "jump" operation, by engaging and then disengaging the clutch 142. If the cut is particularly heavy, it may even be desirable to commence cut-off more or less concurrently with the forming.

With a proper setting-up and operation of my machine, final cut-off will take place only after the turret tools have been retracted after the final working cycle of the turret. Upon retraction of the cut-off slide 21, cam 182 will operate the stock-stop 28 to bring it down into stock-stopping position, and the cam 184 will open the collet 14. This opening of the collet will be understood to permit stock-feeding forces to push the stock 13 forward into abutment with the stock-stop 28, at which time the cam 184 may again clamp the collet 14, and the stock-stop 28 may be retracted. The turret-starting cam 167 will then be in position again to actuate the rocker arm 169 so as to engage clutch 69 for starting the turret camshaft 31. The described cycle of automatic operation may repeat itself.

*Variable feed control for the turret.*—In certain applications it may be desirable to produce different feeds for successive working positions or stations of the turret 15. These feeds may represent variations of the speed of the slow-speed-drive motor 70. In the form shown in Figs. 4 and 8, these various slow speeds are timed by a master cam 193, shown mounted on a sleeve 194 tied to the turret, so that the sleeve (and therefore the cam 193) may index with the turret 15. The cam 193 is shown provided with a number of grooves or flats 195—196—197—198 axially spaced and also preferably angularly spaced in quadrature relation. Cam-follower rods 199 may be guided for longitudinal sliding action by guide means (not shown) and positioned to ride on the cam 193 for engagement with the various grooves 195 ... 198. The cam-follower rods 199 may be normally urged into the described contact with cam 193 by means of springs (not shown) in a plurality of electric switches 200—201—202—203, which are preferably of the normally closed type, that is, the switches 200 to 203 may include resilient means for normally urging their contacts open. Thus, for the positions shown, with these same springs urging the rods 199 into constant contact with the cam 193, there may only be one of the switches closed at any instant of time.

Each of the switches 200 to 203 may be in the circuit of the motor 70 and in the circuit of a different adjustably variable resistance 204—205—206—207 to provide the necessary speed control for motor 70. Thus, the switch 200 may normally be poised for switching the resistance 242 into shunt relation with the motor 70, so as to control the speed of motor 70 in accordance with the setting of resistance 242. This speed control will be understood to be effective only when the follower rod 199 for switch 200 rides in the groove 195 of cam 193, and it will be further understood that the placement of the groove 195 may correspond with a particular one of the working stations of the turret 15. The same applies for the other switches 201—202—203, each serving to introduce a different independently variable speed-control resistance 243—244—245 when actuated by the grooves 196—197—198, respectively, of cam 103. Thus, for each indexed position of the turret 15, there may be a slow feed particularly suited and adjusted for the type of tool to be utilized or cut to be made at that station.

Thus far, the circuit of Fig. 8 has been described as providing a means for selectively varying the slow-feed speed for the turret, but in accordance with a feature of the invention certain further elements may introduce more flexibility in the slow-speed feed for any particular turret position. In the form shown, a variable resistor 267 is connected in series with the motor 70, and a normally open limit switch 268 is connected to shunt out the resistor 267 in accordance with a program provided by a cam 269. The cam 269 may be on the auxiliary camshaft 84, which, it will be recalled, completes a full revolution upon a full cycle of use of all the turret stations.

For the relationship shown, the switch 268 is actuated so as, in effect, to place the resistor 267 in the series connection and thus to provide an even slower feed for the first turret station than would normally be provided by the mere operation of switch 203 in conjunction with resistor 245. Upon further rotation of the cam 269, the contact of switch 268 may be closed so as to shunt resistor 267 and to provide control of motor 70 solely in accordance with the setting of resistors 242—243—244—245, as the case may be.

It will be noted that upon a proper timing of the cam 269 with respect to one of the grooves of the cam 193, it is possible to provide two separate relatively slow feeds for a particular turret position. This multiplicity of slow feeds thus achieves the function of a number of complex cam surfaces, but with inherently simple cams and variable resistances.

As an alternative speed-control means for producing a plurality of slow feeds for a particular turret position, I may employ a circuit as schematically indicated in Fig. 8a. In accordance with the circuit of Fig. 8a, a shunt resistor 270 is selectively switched across one or more of the normal speed-control resistors 242—243—244—245, as the case may be. The cam 269 may be driven by the shaft 84 to operate contacting means 271 for this purpose. It will be understood that the contacting means 271 may be normally urged by cam 269 into the position shown, namely, into a position placing the resistor 270 in parallel with the motor 70. When the contacts of switch 271 are opened (and this opening may occur for but a portion of the actuated period of any one of the switches 242—243—244—245), it will be understood that an even slower feed will be provided for the motor 70 in accordance with the particular setting of one or more of the resistors 242—243—244—245.

Although certain of the feeds have been described as being provided by electric-motor drives, it will be clear that other methods may be employed with effectiveness. In Fig. 9, I illustrate, by way of example, an alternative variable speed drive for the slow or feed portions of the cycle for the turret camshaft 31. Such an alternative arrangement may utilize the previously described timing cam 193, for the adjustable variable hydraulic control of turret feed.

In the form shown, pressure fluid from a hydraulic source (not shown) flows in a supply pipe 255 to a gear or other hydraulic motor 256 having an output or drive connection to the worm and worm-wheel 71 for the turret slow-speed drive. Control of the speed of motor 256 is shown to be effected on the outlet side through a selected one of four parallel hydraulic circuits. Each of these circuits may include a shut-off valve 257—258—259—260 in series with an adjustable orifice, swashplate, or other flow obstruction 261—262—263—264. The actuating arms for valves 257 . . . 260 may be positioned by actuating rods 265, which may be guided by a fixed block or by other means (not shown). Springs 266 may serve to maintain the valve arms against the rods 265 and to urge the rods 265 in constant riding contact with cam 193, opposite the respective grooves 195 . . . 198 thereof. Valves 257 . . . 260 are preferably closed when actuated to the right and open when cranked to the left. Thus, if the rod 265 for valve 259 is in its groove (197), valve 259 is open and permits a flow (and hence a feed speed) dependent upon the adjustment of orifice 263. This controlled feed speed will apply for one of the turret working stations and will repeat each time that working station is positioned for working. In like manner, adjustment of orifices 261—262—264 may control proper feed speeds for the other turret working stations.

To permit a shutdown of the slow-speed drive, as when rod 98 is actuated far to the left under the influence of the highest cam lug 89, a further valve 267 preferably has an actuator arm resiliently urged toward the rod 98 and positioned to close valve 267 only upon extreme leftward shifting of rod 98—that is, only once in four turret-camshaft cycles. This event, it will be recalled, occurs when the turret camshaft 30 is shut down during final cut-off and rechucking, and the motor 256 may start again as soon as rod 98 is shifted to the right under the action of the turret-starting cam 167.

To complete the analogy between the hydraulic circuit of Fig. 9 and the electric circuit of Fig. 8, a further flow restriction, such as variable orifice means 272, may be placed in series with one of the supply lines to the motor 256, and a valve 273 may be connected to control the flow or not of hydraulic fluid around, that is, in shunt relation across, the variable orifice 272. The valve 273 may correspond to the limit switch 268 and be actuated by the cam 269, which it will be recalled may be driven by the shaft 84. For the type of cam 269 shown, the valve 273 is preferably normally urged by the spring 274 in a direction to cause the shunt connection and hence in a direction to provide greater motor speed in accordance with the individual settings of variable orifices 261—262—263—264. When the valve 273 is dropped by the slot in cam 269, the shunt connection is blocked or constricted so that the flow to the motor 256 may be more restricted—thus providing a further reduced motor speed, as will be clear.

Having established the analogy between the electric and hydraulic circuits of Figs. 8 and 9, it will be clear without further illustration that the functions of the electric circuit of Fig. 8a may be performed hydraulically, as by cam-programmed introduction of adjustably variable flow in parallel with the valves and orifices 260—264, 259—263, etc.

*Cut-off safety feature.*—It has been suggested that, in the event of a relatively heavy cut-off cut, it may be desirable to feed the cut-off slide 21 for a substantial period of time, that is, for a period perhaps greater than one of the working cycles of the turret 15. In that event, I provide means for assuring that cut-off feed may be arrested before the stock becomes too insecurely supported for continued turning operations. In a typical case, this may means stopping the cut-off tool when it is of the order of $\frac{1}{8}$ inch from completing the cut-off operation, thus permitting first a completion of turning operations and a retraction of the turning tools from the work.

In the form shown, this safety function may be effected by two cooperating safety cams 204—205 (Fig. 6), the cam 204 being carried by the turret camshaft 31, and the cam 205 being carried by the forming-slide camshaft 30. Both the cams 204—205 may be interconnected by a differential linkage to produce a disengagement of the clutch 136 only when the actuating surfaces of cams 204—205 coincide in time. In the form shown, the differential mechanism comprises a slide rod 206 having the follower 207 poised to engage the cam 204. The cam-follower rod 206 may be connected to a second cam-follower means 208 in the form of a link having a roll 209 poised to engage the cam 205. When, and only when, the actuating surfaces of cams 204—205 coincide, the link 208 will be actuated generally counterclockwise to shift a thimble 210, and hence the slide rod 211, to the left. The slide rod 211 may carry an arm or fork 212 to engage a bar 213 normally in the actuating spool of clutch 136. Thus, only when the actuating surfaces of cams 204—205 coincide will the forked arm 212 be sufficiently shifted to the left to cause disengagement of clutch 136, and thus a shutting down of the forming-slide camshaft 30, i. e. of the cut-off function. Should the actuating surface of cam 205 present itself to the cam-follower roll 209 at a time when the cam follower roll 207 is opposite the dip 214 on cam 204, the resultant motion of the differential linkage will be entirely wasted in a leftward shifting only of the slide rod 206, and the clutch 136 will thus be permitted to remain engaged.

In operation, the above-described safety mechanism may be effective under the following circumstances. Say that there is to be a relatively long cut-off operation, so that the forming-slide camshaft 30 may possibly have had to be started in the third working cycle of the turret. Cut-off may still be proceeding when the turret is indexed into fourth position, but the turret tools must first be withdrawn, and a certain amount, say of the order of ⅛ inch, of stock should be left for proper support of the work during the fourth turret cycle. In such case, the cam 204 (in its cycle for the third turret position) will be presenting its high or actuating surface to the cam-follower roll 207 when the cam 205 reaches the roll 209 (and the latter event may be set to occur for a cut-off tool position that will leave sufficient stock to support the work). Since both rolls 207—209 will then simultaneously engage their respective safety cams, the clutch arm 212 will be shifted to disengage the clutch 136 and thus to stop further cut-off feed (during the remainder of the third turret position and during the fourth turret position). Turret retraction, indexing, and feeding will, however, proceed, and by proper placement of the second cam lug 104 on the cam disc 102, the cam follower 155 (for starting the forming-slide camshaft 30 again) may be actuated only after all the turret tools are clear of the work (i. e. after completing the feed cycle for the last indexed position of the turret). Upon actuation of the follower 155, the rod 151 is shifted to the right so as to engage the drive to the forming-slide camshaft 30 and thus to permit continued cut-off until completion of cut-off.

Manual operations

In setting up the machine and in a semi-automatic operation of the machine, certain manual operations will be found convenient. A manual operation of the turret-locking mechanism, as by lifting the hand lever 55, has already been described.

A second manual operation involves provision for clutching and declutching the drives to both camshafts 30—31, from either side of the machine. This function may be effected by pulling or by pushing either one of the handles 215—216, which are located, respectively, on the operator's side (right side) and on the side opposite (left side). Pulling the handle 215 will be seen to crank an arm 217 and, through a rack and pinion 218, to shift a slide rod 219 to the right (in the sense of Fig. 6). In the same way, pulling the handle 216 cranks a bell-crank 220 to push the same slide rod 219 to the right. The slide rod 219 may carry a first forked arm 221 to engage the actuating member 213 for clutch 136, and it may also be linked (by means of twin rocker arms 222—223, and at slots 224—224') to the shift rod 98 for the high-speed turret drive clutch 69.

It will be understood that when either of the handles 215—216 is pulled, the actuating rod 98 will be shifted to the right so as to engage the turret-camshaft drive clutch 69 and so as to engage the forming-slide camshaft drive clutch 136, and that when either of these handles is pushed, not only may the clutches 69—136 be disengaged, but the limit switch 100 may also be operated so as to disconnect the slow-speed motor 70.

In setting up the machine, it may be desirable manually to rotate one of the camshafts 30—31 independently of the other. In setting up the turret camshaft 31, for example, a knob 225 on the left-hand side of the machine may be pushed in to engage a pinion 226 with a gear 227, the gear 227 being located between the worm 67 and the high-speed clutch 69. The worm 226 may be driven by a sprocket 228, operated as by a hand-crank 229. To assure easy turning with the hand-crank 229, a pushing-in of the knob 225 is accompanied by a declutching of connections to the slow-speed drive 70. Thus, a rocker arm 230 may shift a slide rod 231 to move a clutch fork 232 to the left, that is, in a direction to disengage a clutch 233 between the overrunning clutch 76 and the worm 67. The described operation of knob 225 is preferably only possible against a resilient action, as provided by a compression spring 234. In order manually to rotate the turret camshaft 31, the knob 225 must, therefore, be constantly pulled while the hand-crank 229 is operated. Release of the knob 225 assures disengagement of the pinion 226 from the high-speed drive shaft 66 and at the same time a reengagement of the clutch 233. Thus should the main motor be started, the hand-crank 229 will not be gyrated if the knob 225 is left alone.

On the operator's side of the machine, provision may be made for similar manual rotation of the forming-slide camshaft 30. In the form shown, a knob 236 must be pushed in against the resilient action of a spring (not shown) in order to engage a pin 237 in a slot 238 so as to lock a sprocket drive 239 to the drive shaft 240. The sprocket drive 239 may be operated by a hand-crank 241. It will be clear that, as in the case of turret camshaft adjustment, the forming-slide camshaft 30 may be rotated manually when the knob 236 is pushed and held in, and while the crank 241 is turned.

In setting up the machine, it may also be desirable to operate the collet or chucking mechanism by hand, and provision may be made for such operation from the operator's side of the machine, upon actuation of the hand-crank 242. In the form shown, the crank 242 rotates a cross shaft 243 to operate a crank 244, connected to the collet-actuating rod 186, by means of a link 245. In operating the crank 242, the cam 184 should be loosened on the forming slide camshaft, or the cam follower 185 should be loosened on the collet-actuating rod 186, thus permitting free manual operation. If the machine is to be employed for automatic chucking, it is preferred that the handle 242 be disengaged, say, from the shaft 243 by means of a safety mechanism 246 (not shown in detail). In cases in which the machine is to be operated semi-automatically, that is, automatic except for manual chucking, it will be clear that the only necessary adjustment may be a disengagement of the chucking cam 184.

Summary

It will be clear that I have described a mechanism for permitting great flexibility in the accomplishment of varied, complex, automatic operations. Whether the operations involve turning or cross-feeding, they may be effected with precision and they may be fully synchronized. The use of dual camshafts, one essentially for the turret operations, and the other essentially for the forming operations, may be very useful, particularly in that variable slow and high-speed drives are independently available to each camshaft. The machine may be adapted to the use of turrets having any desired number of working stations, merely by an appropriate selection of the gear ratio in the index mechanism, and it will be clear that if it is desired to use a given turret for fewer than the working stations on such turret, there need be very little time lost for the unused working station. By omitting one of the slow-speed cam lugs 89 on the timing disc 90, it will be clear that for the missing cam lug 89, there will be no declutching of the high-speed clutch 69, and that therefore the unused working station may be traversed at high-speed.

In addition to the functional flexibility of my machine, it is to be noted that the placement of parts offers great convenience for ease in setting up and servicing the machine. For example, substantially the entire drive mechanism for the forming-slide camshaft 30 is contained within the box 124, and it will be evident from Fig. 7 that this mechanism may be removed as a unit through the holder 247 normally covered by the plate 248 on the operator's side of the machine. Change gears 126—127 of the mechanism in box 124 are readily accessible through a further and more readily removable coverplate 249, and for safety purposes the manually operated sprocket 239 may be covered by a guard 250. In order to effect relatively substantial changes in the drive from slow-speed motor 70, change gears 72—73 may project beyond the front face of the machine, to be accessible upon removal of a cover plate 251. A sliding panel 252 may provide access to the change gears in the spindle drive. Another sliding panel 253 may permit access to the turret cams, and there may be a safety cover 254 over the sprocket 228 for manual adjustment of the turret camshaft.

While I have described certain manual operations in addition to a fully automatic functioning of my machine, it will be clear that semi-automatic operation is also feasible, as when using the machine as a chucker. In such a semi-automatic operation, and if manual chucking is desired, the chucking lever 242 may be adequate and could be used in conjunction with an appropriately formed chucking cam 184, as by removing the "chuck-closing" face of cam 184. In order to bring the spindle 12 to a halt for each chucking operation conventional means (not shown) could clearly be employed to declutch and brake the spindle upon operation of the then "unchucking" cam 184; upon shifting the lever 242 in a chucking direction, the same conventional means could clutch-in the spindle drive, and therefore start the forming-slide camshaft 30 through jackshaft 123. All other operations could then proceed as described for a full cycle of multiple-station turning and of forming, at which time the "chuck-opening" face of cam 184 could stop the drive to spindle 12 (and, hence, the drive to forming-slide camshaft 30) and open the chuck for removal of the finished piece and for insertion of a new blank. It will be remembered that switch 100 and turret high-speed clutch 69 will have been operated so as to shut down the turret camshaft 31 before the described unchucking may take place in the semi-automatic operation; the machine may thus be shut down, except for continuous running of main motor 60, while manual chucking proceeds.

Although I have described my invention in detail for the preferred forms shown, it will be understood that modifications may be made within the scope of the invention, as defined in the claims which follow.

I claim:

1. In a machine of the character indicated, a turret and a camshaft for feeding said turret, a forming slide and a camshaft for feeding said forming slide, independent drive means for said camshafts and including a separate clutch for said forming-slide camshaft, said forming-slide camshaft having a longer timed cycle of operation than said turret camshaft, a safety cam on said turret camshaft and providing a clutch-actuating interval including the feed period of said turret, a safety cam on said forming-slide camshaft and providing a clutch-actuating interval for a period prior to but not including a final operation of said forming slide, cam-follower means for each of said safety cams, and clutch-actuating means linking said cam-follower means and said clutch.

2. In a machine of the character indicated, an indexible turret having $n$-stations and a camshaft for feeding said turret, a forming-slide means including cut-off means and a camshaft for feeding said forming-slide means, independent drive means for said camshafts and including a separate clutch for said forming-slide camshaft, said turret camshaft having $n$ cycles of operation for one cycle of operation of said forming-slide camshaft, a first safety cam on said turret camshaft and providing a clutch-actuating interval including the feed period of said turret, a second safety cam on said forming-slide camshaft and providing a clutch-actuating interval for a period prior to but not including a final operation of said cut-off means, cam-follower means for each of said safety cams, and clutch-actuating means including means differentially linking said cam-follower means, whereby a cut-off operation by said forming slide may be arrested prior to full cut-off if a tool operated by said turret camshaft is not then safely out of the work supported in said machine.

3. In a machine of the character indicated, a turret and a camshaft for feeding said turret, a cross slide and a camshaft for feeding said cross slide, independent drive means including a separate clutch for said cross-slide camshaft, a first safety cam on said turret camshaft and including an actuating surface of effective extent to include the feed period of said turret camshaft, said first safety cam being ineffective to produce an actuation at a time which does not include the feed period of said turret camshaft, a second safety cam on said cross-slide camshaft and including an actuating surface timed to be effective prior to a final operation of said cross slide, said second safety cam being ineffective to produce an actuation at the time of a final operation of said cross-slide, and clutch-actuating means including cam-follower means differentially responsive to a coincidence of said surfaces at said cam-follower means.

4. In a mechanism of the character indicated, a first camshaft including a safety cam, a second camshaft including a safety cam, independent drive means for said camshafts and including a clutch for one of said camshafts, and a safety actuating mechanism for said clutch, said mechanism including a differential lever to be actuated at spaced points by said cams, and means coupling a third point on said lever to said clutch.

5. In a machine of the character indicated, a spindle, a multiple-station tool turret, a turret camshaft, a turret-indexing mechanism driven by said turret camshaft, a high-speed drive, a variable slow-speed drive, means carried with said turret and therefore indexed upon an indexing of said turret for changing the speed of said slow-speed drive, said means including cam means providing separate speed control for a plurality of indexed positions of said turret, whereby speed-changes in said slow-speed drive may be effected only and assuredly during an indexing of said turret, and means connecting said high-speed drive to said turret camshaft at least during the indexing of said turret, whereby speed-changing of said slow-speed drive may be effected while said slow-speed drive has been relieved of its load.

6. In a machine of the character indicated, a tool slide, indexing means for said tool slide, high-speed drive means and means for connecting the same to said indexing means at least during an indexing of said tool slide, a camshaft including a cam for feeding said tool slide, slow-speed drive means for driving said camshaft, selectively variable speed-control means for said slow-speed drive means including cam means operating in general synchronism with said camshaft and positioned to actuate said control means, said speed-control means being effective to change the speed of said slow-speed drive means only while said high-speed drive means is connected to said indexing means whereby said second-mentioned cam may effectively modify the contour of said first-mentioned cam so as to provide a selectively variable feed program for said tool slide at different indexed positions of said tool slide without modifying said first-mentioned cam.

7. In a machine of the character indicated, a spindle, a multiple-station tool turret, a turret camshaft, a turret-indexing mechanism driven by said turret camshaft, a high-speed drive, a variable slow-speed drive including an electric motor and means driven by said camshaft for varying the speed of said slow-speed drive, said means including cam means providing separate speed control for a plurality of indexed positions of said turret, said means also including a separate independently adjustable speed-control impedance associated with said motor for each indexed position of said turret, said cam means including switching means in the circuit of each said impedance for switching into the circuit of said motor a different impedance for each of said plurality of indexed positions of said turret, and means connecting said high-speed drive to said turret camshaft at least during the indexing of said turret.

8. A machine according to claim 5, in which said variable slow-speed drive includes a hydraulic motor, and separate independently adjustable flow-control means associated with said motor for each indexed position of said turret, said cam means including switching means in the circuit of each said flow-control means for switching into the circuit of said motor a different flow-control means for each of said plurality of indexed positions of said turret.

9. In a machine of the character indicated, a turret, a turret camshaft, forming-slide means, a forming-slide camshaft, slow-speed-drive means and high-speed-drive means for said camshafts, clutch means for selectively drivingly engaging one or the other of said drive means to said turret camshaft and including a positive clutch between said high-speed-drive means and said turret camshaft and an overrunning clutch between said slow-speed drive means and said turret camshaft, whereby upon engagement of said positive clutch there may be a high-speed drive of said turret camshaft and upon disengagement of said positive clutch there may be a slow-speed drive of said turret camshaft through said overrunning clutch, and brake means transiently effective to brake said turret camshaft during a selective transfer of drive from said positive clutch to said overrunning clutch, whereby in changing from a high-speed drive to a slow-speed drive said brake means may rapidly decelerate said turret camshaft for time-saving purposes during a speed-changing operation.

10. A machine according to claim 5, in which cam means driven in timed relation with said turret camshaft is effective to engage said turret camshaft with said high-speed drive during operation of said turret-indexing mechanism, whereby speed-changing of said slow-speed drive may be effected during a condition of no load on said slow-speed drive.

11. In a machine of the character indicated, a turret, a turret camshaft including means for feeding said turret and means for indexing said turret, a forming-slide camshaft, forming-slide means, means driven by each of said camshafts for stopping one and recycling the other of said camshafts, high-speed drive means and means for selectively clutching said camshafts independently to said high-speed drive means, and slow-speed drive means with means for independently selectively clutching said camshafts thereto, the slow-speed drive means for said turret camshaft being wholly independent of the slow-speed drive means for said forming-slide camshaft.

12. In a machine of the character indicated, an indexible turret and a camshaft for feeding said turret, forming-slide means including cut-off means, a camshaft for feeding said forming-slide means, independent drive means for said camshafts and including separate clutches for said camshafts, a first safety cam on said turret camshaft and providing a clutch-actuating interval including the feed period of said turret, a second safety cam on said forming slide camshaft and providing a clutch-actuating interval for a period prior to but not including a final operation of said cut-off means, clutch-actuating means including cam-follower means for each of said safety cams and means differentially linking said cam-follower means, said clutch-actuating means being disposed to declutch said forming-slide camshaft and to clutch said turret camshaft upon an effective differential operation of said cam-follower means.

13. A machine according to claim 12, in which said turret camshaft further includes means effective after completion of the feed period of said turret for reclutching said forming-slide means, whereby said turret camshaft may complete turret-tool retraction after a safety-operated declutching and therefore arresting of cut-off and further whereby cut-off may be safely completed after turret-tool retraction.

14. In a machine of the character indicated, a spindle, a spindle drive including a selectable multiple-speed drive, a turret, a turret camshaft, forming-slide means, a forming-slide camshaft, means driven by each of said camshafts for automatic recycled operation of said camshafts, and means driven by said forming-slide camshaft and in actuating relation with the speed-changing mechanism for said spindle, whereby spindle speeds may be governed in accordance with a program of said forming-slide means, regardless of the cycle of operation of said turret.

DONALD H. MONTGOMERY.

REFERENCES CITED

The following references are of record in the file of this patent:

UNITED STATES PATENTS

| Number | Name | Date |
|---|---|---|
| 1,076,734 | Austin | Oct. 28, 1913 |
| 1,193,258 | Gorman | Aug. 1, 1916 |
| 1,892,239 | Kelley | Dec. 27, 1932 |
| 2,065,816 | Lovely et al. | Dec. 29, 1936 |
| 2,086,851 | Bullard | July 13, 1937 |
| 2,264,804 | Lovely | Dec. 2, 1941 |
| 2,270,310 | Kelley | Jan. 20, 1942 |